United States Patent [19]

Keate et al.

[11] Patent Number: 4,887,042

[45] Date of Patent: Dec. 12, 1989

[54] HIGH SPEED MULTI-CHANNEL PHASE DETECTOR

[76] Inventors: Christopher R. Keate; Jeffrey Mac Thornock, both of Unisys Corp., Law Dept., P.O. Box 500, Blue Bell, Pa. 19424

[21] Appl. No.: 222,700

[22] Filed: Jul. 22, 1988

[51] Int. Cl.$^4$ .......................... H03K 9/06; H03L 7/00
[52] U.S. Cl. .................................. 328/133; 328/155; 307/511; 307/350
[58] Field of Search .............. 328/133, 151, 166, 155; 307/511, 512, 514, 350

[56] References Cited

U.S. PATENT DOCUMENTS

| | | | |
|---|---|---|---|
| 3,539,930 | 11/1970 | Steole | 328/166 |
| 3,617,900 | 11/1971 | Fink | 328/166 |
| 3,798,557 | 3/1974 | Scott et al. | 328/133 |
| 3,840,817 | 10/1974 | Seki | 328/133 |
| 4,362,956 | 12/1982 | Ogasawara et al. | 328/158 |
| 4,398,154 | 8/1983 | Lee | 307/350 |

*Primary Examiner*—Stanley D. Miller
*Assistant Examiner*—Timothy P. Callahan
*Attorney, Agent, or Firm*—John B. Sowell; Robert S. Bramson; Mark T. Starr

[57] ABSTRACT

A phase detector for a multi-channel PSK receiver is provided with a plurality of phase channels. Each of the phase channels has its own comparator coupled to an electronic switch for producing signals which are the products of the analog data inputs on the phase channels. The outputs from the electronic switches are connected to positive and negative summing circuits and the output of the positive and negative summing circuits are connected to the positive and negative inputs of a differential amplifier which produce a sum of the difference of the absolute value of the analog data inputs which is employed as an error voltage signal to control the frequency of a voltage controlled oscillator in a multi-channel PSK receiver. By eliminating convention analog multipliers in the phase detector, the phase detector is capable of generating error voltage signals from analog data input signals having data rates as high as 5 gigabytes per second.

7 Claims, 3 Drawing Sheets

4,887,042

HIGH SPEED MULTI-CHANNEL PHASE DETECTOR

BACKGROUND OF THE INVENTION

1. Related Applications

This invention is related to our co-pending Application Serial No. 07/138,184 filed 28 Dec. 1987 and now U.S. Pat. No. 4,833,639 entitled HIGH SPEED ANALOG MULTIPLIER-ABSOLUTE VALUE DETECTOR.

2. Field of the Invention

The present invention is related to phase detectors for high speed phase locked loops of the type employed in quadrature phase shift key (QPSK) receivers. More particularly, the invention relates to a high speed computational circuit for generating the sum or difference of the absolute value of two or more signals and may be employed as a phase detector for multi-phase QPSK demodulating receivers.

3. Description of the Prior Art

Our co-pending Application Serial No. 07/138,184 shows and describes a high speed analog multiplier which is capable of being operated as an absolute value detector. Prior to the invention described in this co-pending application, analog multipliers had been limited to speeds or frequencies of around 25 megahertz before distortion rendered the output unusable. The high speed analog multiplier in our co-pending application avoided the limitations on operable frequencies imposed by the use of commercially available diodes multipliers.

Prior art phase detectors for multi-phase shift key (PSK) receivers also employ commercially available diodes and operational amplifiers which have limited the operational frequency of these prior art phase detectors to about 25 megahertz. Prior art multi-phase detectors employed analog multipliers having cross-channel inputs which produce complex cross-channel modulated output products that have limited the operational frequency of this type of multiplier in a cross-channel mode used to approximately 10 megahertz.

It would be extremely desirable to provide a high speed multi-channel phase detector which is capable of speeds of about 400 megahertz employing commercially available semiconductor devices and having speeds up to 5 gigahertz employing gallium arsenide semiconductor devices without distortion.

SUMMARY OF THE INVENTION

It a principal object of the present invention to provide a QPSK phase deteetor for high speed operation.

It another primary object of the present invention to provide a multi-phase phase detector for demodulation of signals in a PSK receiver.

It is another primary object of the present invention to provide a novel summing circuit which is coupled to the input of a differential amplifier which produces the sum or difference of the analog voltage input signals and eliminates complex cross-channel modulation signals produced in multichannel PSK receivers.

It is a general object of the present invention to provide a multi-channel phase detector capable of being operated at a high computational speeds to produce the sum or difference of the absolute value of a plurality of input channels.

According to these an other objects of the present invention there is provided a phase detector having a plurality of phase channels. Each of the phase channels has its own comparator and is coupled to an electronic switch which produce outputs that are functions of the input data signals. The outputs of the electronic switches are connected to positive and negative summary circuits. The positive and negative summing circuits are connected to the positive and negative inputs of a differential amplifier to produce a sum or difference of the absolute value of the inputs at the output of the differential amplifier. The output signal of the differential amplifier may be employed as an error voltage signal to control the frequency of a voltage controlled oscillator in a phase locked loop operated at very high data rate frequencies.

DESCRIPTION OF THE PREFERRED EMBODIMENT

Figure 1:
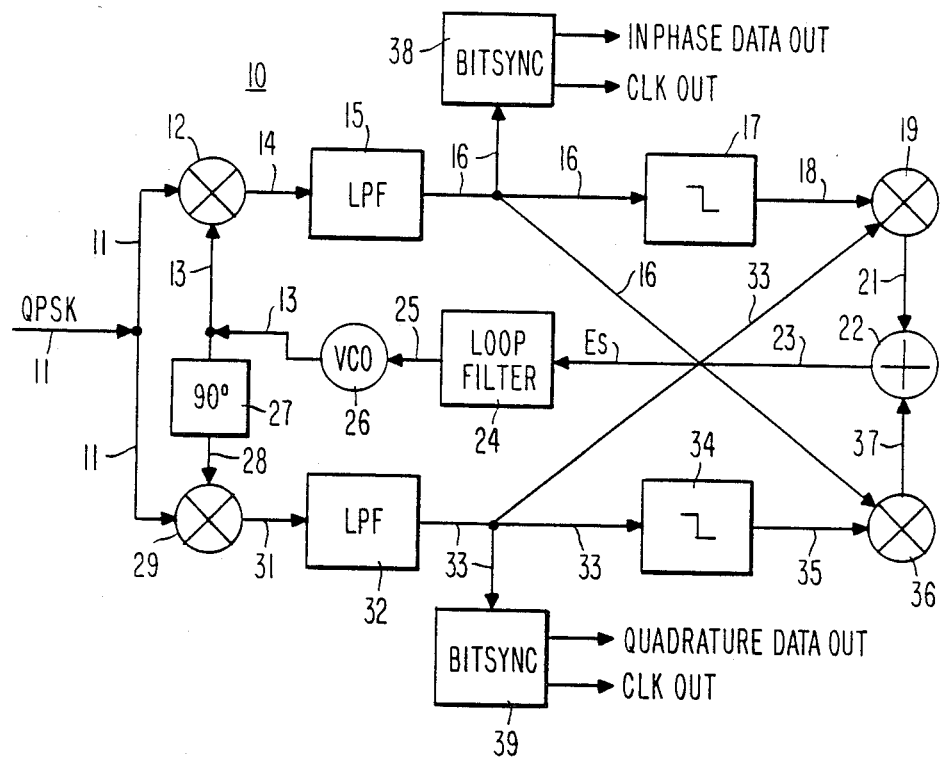
FIG. 1 is a block diagram of a prior art QPSK phase locked loop employing low speed analog multipliers at the output stage.

Refer now to FIG. 1 showing a block diagram of the prior art QPSK phase locked loop receiver which is limited to data rate frequencies of approximately 25 megahertz when employing low speed analog multipliers at the output stage. The QPSK receiver 10 is shown having a QPSK input signal on line 11 which is applied to a mixer 12 having a second input on line 13 from a voltage controlled oscillator to produce a data modulator frequency error voltage on line 14. The signal on line 14 is applied to a low pass filter 15 to produce a filtered signal on line 16 which is applied to a hard limiter 17 to produce an analog signal on line 18 which is an analog data estimate of magnitude plus or minus one as is well known in this art. The signal on line 18 is applied to an analog multiplier 19 which conventionally comprises diodes to perform the operational mode of analog multiplication. The prior art analog multiplier 19 produces distortion which limits the data rate on line 18 to a frequency of approximately 25 megahertz. The output of analog multiplier 19 on line 21 is applied to a combining circuit 22 to produce an analog error voltage signal on line 23 which is applied to filter 24 to produce the filtered error signal on line 25 which is applied to the voltage controlled oscillator (VCO) 26. The data tracking loop comprises the elements 12 through 26 and enables the voltage controlled oscillator to track and lock on to the QPSK data signal on line 11. The oscillator signal on line 13 is also applied to a 90° phase shifter 27 to produce a phase shifted signal on line 28 which is applied to mixer 29 along with the QPSK data signal o line 11 to produce a data modulated and phase shifted signal on line 31 which is applied to low pass filter 32 to produce a filtered signal output on line 33. The filtered signal output on line 33 is applied to hard limiter 34 to produce an analog voltage estimate of the data on line 35 which has a value of plus or minus one. The analog voltage on line 35 is applied to a second mixer 36, similar to mixer 19, to produce an output signal on line 37 which is applied to the combining or summing circuit 22 to produce the aforementioned error voltage signal on line 23.

It will be noted that mixers 19 and 36 both receive data modulated error control signals on line 33 and 16 respectively which are multiplied in multipliers 19 and 36 to produce error control voltages plus data cross-products on line 21 and 37 respectively that are removed when they are combined in combining means 22. The result of combining the signals on line 21 and 37 results in elimination of the cross-channel products and provides only the error voltage signal on line 23. The elements 27 through 37 and 23 through 26 define a second data tracking loop for the QPSK receiver. Binary phase PSK receivers only require one tracking loop and do not have the complications and problems of cross-channel modulation.

The QPSK data signal on line 11 includes inphase and a quadrature data signals which are divided in the two tracking loops to produce an inphase data signal out of the bit synchronizer 38 and a quadrature data signal out of the bit synchronizer 39. Bit synchronizers 38 and 39 are commercially available and do not require further explanation here.

Figure 2:
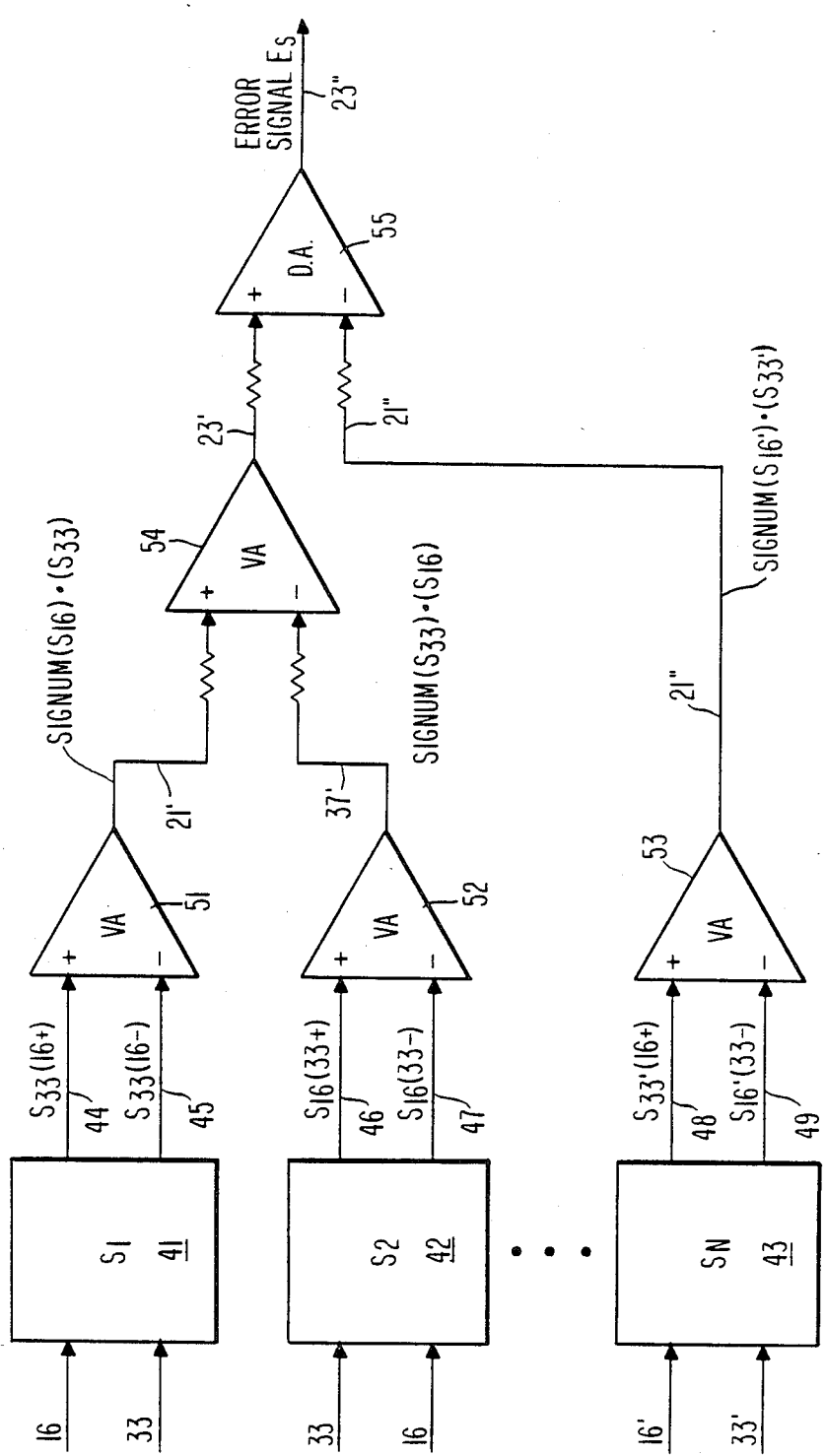
FIG. 2 is a block diagram of an improved QPSK or N channel high speed absolute value detector.

Refer now to FIG. 2 showing a block diagram of an improved QPSK error detector which could be substituted in the detector stage in FIG. 1 to extend the frequency response range of the detector by employing the teachings of our co-pending Application Serial No. 07/138,184. As will be explained hereinafter, a direct approach to using the teachings of this co-pending application results in an expensive solution to eliminating the analog multipliers 19 and 36 shown in FIG. 1. If the QPSK signals on lines 16 and 33 are processed and applied to the electronic switches 41, 42 and 43 of the type shown and described in our aforementioned co-pending application, the signals designated on lines 44 to 49 are produced. The signal output from electronic switch 41 produces signal $S_{33}$ on line 44 when the input control signal on line 16 is positive or high. Similarly, the signal $\overline{S_{33}}$ is produced on line 45 when the voltage control signal on line 16 is negative or low. Similar designations are applied to lines 46 to 49 to produce the inputs that are applied to the positive and negative side of the amplifiers at 51, 52 and 53. When the data cross-channel product frequencies on lines 44 to 49 exceed approximately 300 megahertz it is necessary to employ high frequency video amplifiers 51, 52 and 53 instead of the cheaper operational amplifier device which was explained in our co-pending application. Similarly when the output from the amplifiers 51, 52 and 53 produce the signal components designated on lines 21', 37' and 21" that are still at high frequencies, the amplifier 54 must also be a high frequency video amplifier. Even though the signals on line 23' and 21" which are applied to operational amplifier 55 contain high frequency cross-channel data products, it is possible to use the cheaper differential amplifier 55 as will be explained hereinafter because the cross-modulation data products are eliminated or cancelled in the amplifier 55 to produce the error signal ($E^S$) on line 23" which is identical to the error signal on line 23 in FIG. 1. The error signal on line 23" is not limited by the frequency response of the mixers 19 and 36 of FIG. 1 and enable the data rates on lines 16 and 33 to approach 400 megahertz employing commercially available silicon semiconductors. Employing the presently available devices the extent of the frequency range of video amplifiers 51 to 54 is substantially limited to 300 megahertz.

Figure 3:
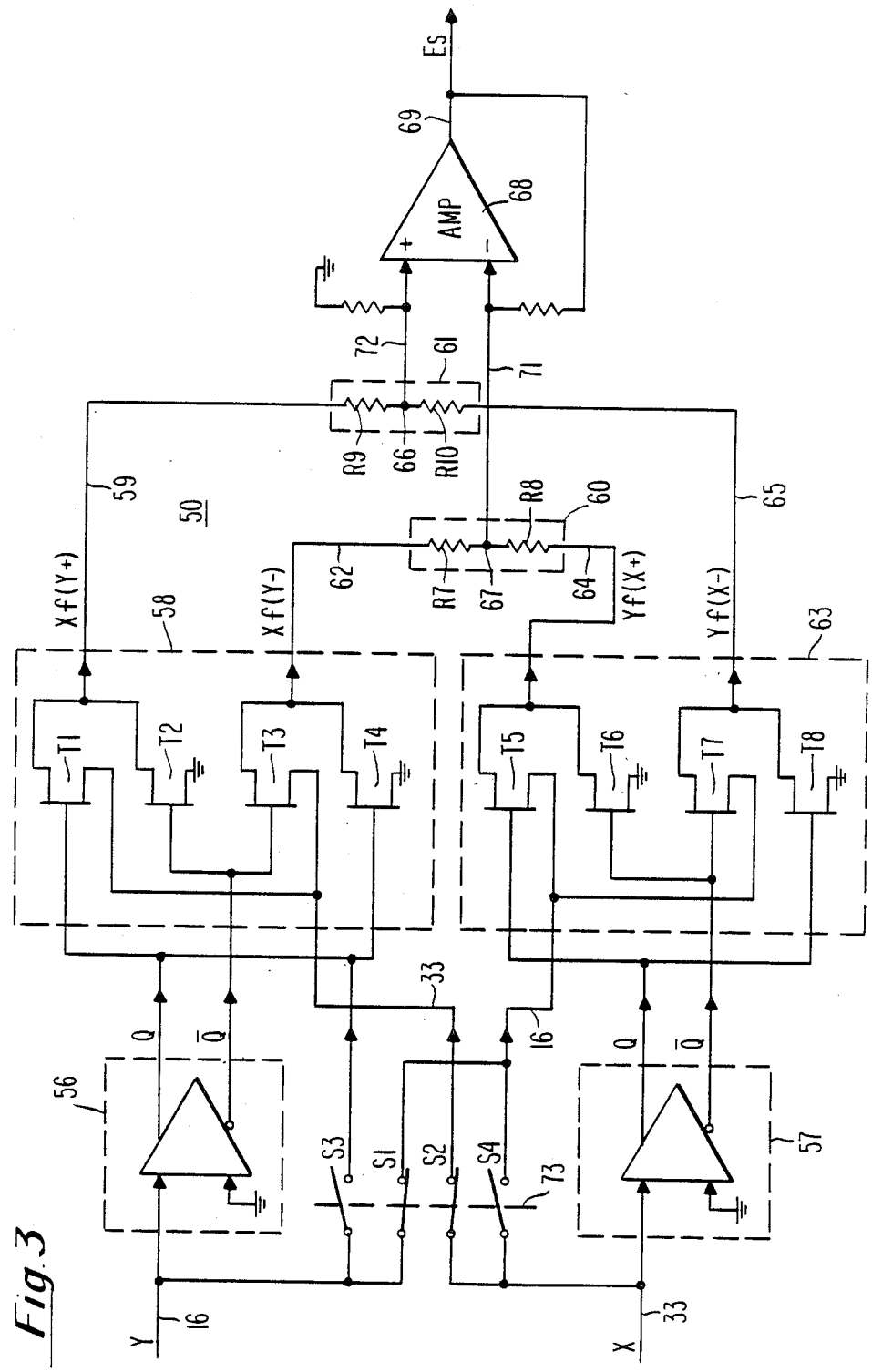
FIG. 3 is a block diagram of a preferred embodiment QPSK or N channel high speed phase detector which may be employed as a multi-channel absolute value detector.

Refer now to FIG. 3 which is a block diagram of the preferred embodiment QPSK phase detector which extends the range of the QPSK receiver shown in FIG. 1 to approximately 5 gigahertz data rate when the structure shown in FIG. 3 is implemented in gallium arsenide. For purposes of explaining how the structure of FIG. 3 can be embodied in the FIG. 1 QPSK receiver, assume that the signals on line 16 and 33 are the Y and X signals being applied to the present invention phase detector 50. The inphase and quadrature QPSK signals on lines 16 and 33 are applied to comparators 56 and 57. The Y signal on line 16 controls the polarity of the output of comparator 56 to produce either a Q or $\overline{Q}$ analog signal which represents the high or low state that is employed to control the electronic switch 58. A simplified explanation of the comparator and electronic switch 58 is as follows. If the Y signal on line 16 is high, the X signal on line 33 appears on line 59 as a X signal which is routed to positive summing means 61 comprising balance summing resistors R9 and R10. In a similar manner when the Y signal is low, the output $\overline{Q}$ from comparator 56 is in the high state and the X signal on line 33 is routed to line 62 connected to the negative summing means 60 which comprises balance resistors R7 and R8. The transistors T1 to T4 which comprise the electronic switching means 58 preferably are high speed field effect transistors which may be implemented in silicon or gallium arsenide technology depending on the frequency range necessary to accommodate the data rate on lines 16 and 33. In similar manner comparator 57 produces a high or Q signal output when the X signal on line 33 is high and produces a high $\overline{Q}$ signal when the value of X on line 33 is low. The Q and $\overline{Q}$ outputs from comparator 57 are employed to control the transistors T5 through T8 of the electronic switch 63. Thus, when X is high, Q is high and the Y signal on line 16 is routed through transistors T5 and T6 to line 64 which is connected to the negative summing means 60. Similarly when the X signal on line 33 is low and the $\overline{Q}$ output signal is high, the Y signal on line 16 is routed through transistors T7 and T8 on line 65 to the positive summing means 61. Positive summing means 61 is provided with a node 66 which is connected to the positive or noninverting input of differential amplifier 68. The node 67 of the negative summing means 60 is connected to the inverting input or negative input of differential amplifier 68 so that the output from the differential amplifier 68 on line 69 is the same as the aforementioned error control voltage Es which appeared on line 23 of FIG. 1 but now has the complex cross-modulation data products removed. It is a feature of the present invention that the operational amplifier 68 is an inexpensive operational amplifier not designed for very high operational frequencies but in the present novel structure accepts the complex data modulation product which appears on both the inverting and noninverting inputs 71 and 72 so that they are effectively cancelled regardless of their complexity and frequency components. When the preferred embodiment structure shown in FIG. 3 was tested using an expensive video amplifier for amplifier 68, it was observed that the voltage error signal on line 69 was not as clean as when using a cheaper operational amplifier because the more expensive and more sensitive video amplifier passed the imperfect cancellation signals of the cross-channel modulation products. Having observed the effectiveness of an operational amplifier connected as a differential amplifier it can be concluded that structural means which produce the sum and difference of inverting and non-inverting inputs on lines 71 and 72 would also cancel the complex crossmodulation products.

The present invention phase detector 50 may also be employed as a multi-channel absolute value detector. In FIG. 3 the switches S1 and S2 are shown normally closed while the switches S3 and S4 are normally open. When actuator 73 is moved to a lower position, switches S3 and S4 close and switches S1 and S2 open which uncouples the crossconnection of the signals on lines 16 and 33 to their associated electronic switches 63 and 58. The connections shown in FIG. 3 produce the absolute value of Y minus the absolute value of X on line 69, however, when the switches S1 to S4 are reversed and one of the signals on lines 16 or 33 is inverted preferably the signal X on line 33, then the output on line 69 appears as the absolute value of the signal X plus the absolute value of the signal Y. Thus, it is possible to add additional N channels by adding additional comparators 56, 57 and electronic switchs 58, 63 and by connecting the positive and negative outputs of the electronic switchs to the positive summing means 61 and the negative summing means 63, as explained hereinbefore. The absolute value of the multiple channels inputs will be produced on output line 69.

Figure 4:
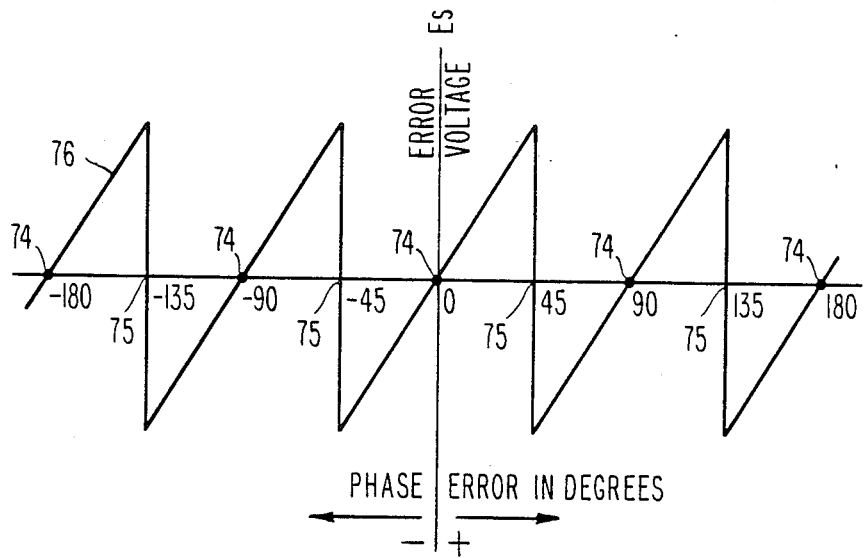
FIG. 4 is a wave form showing the output of the preferred embodiment phase detector of FIG. 3.

FIG. 4 is a wave form showing the error voltage signal Es when the QPSK receiver is out of synchronization with the incoming carrier signal to the receiver. The wave form 76 clearly shows that the phase detector of FIG. 3 has produced an error control voltage wave form 76 which is free of the undesirable data modulation products discussed hereinbefore. This phase error wave form is shown extending from the negative 180° direction to the positive 180° direction and the stable lock point 74 represented by positive crossover of the error voltage presents points where the QPSK receiver will lock onto the incoming signal. The unstable lock points 75 or negative crossover points are incapable of sustaining equilibrium or locking onto the carrier at points 75.

Having explained a preferred embodiment phase detector which may be implemented using commercially available comparators, transistors and operational amplifiers it will be understood that the phase detector shown and described in FIG. 3 is capable of producing voltage error signals employed to track incoming data rates as high as 400 megahertzs using silicon semiconductor technology and tracking incoming data rates as high as 5 gigahertzs per second when employing commercially available gallium arsenide semiconductor technology.

What we claim is:

1. A high speed multi-channel phase detector circuit, comprising:
a phase channel for each analog data input,
each said phase channel comprising comparator means and electronic switching means,
each said comparator means having a logic high and a logic low binary output,
each said electronic switching means being coupled to the logic outputs of one of said comparator means for producing a positive function value output or a negative function value output depending on the coupled logic inputs,
summing means comprising a positive summing circuit and a negative summing circuit coupled to the value outputs of said electronic switching means for producing a product of the outputs of said switching means , and
a differential amplifier having a positive input connected to said positive summing circuit and negative input connected to said negative summing circuit for eliminating all complex data modulation signals from the outputs of said summing circuits and providing a phase detector error voltage signal.

2. A high speed multi-channel phase detector as set forth in claim 1 wherein said complex data modulation signals to be eliminated are formed as identical inputs to the positive and to the negative inputs of said differential amplifier.

3. A high speed multi-channel phase detector as set forth in claim 1 wherein each analog data inputs to said multi-channel phase detector circuit are in quadrature phase relation and the output of said differential amplifier is an error voltage signal for controlling a phase locked loop of a QPSK receiver.

4. A high speed multi-channel phase detector as set forth in claim 3 wherein the outputs from said electronic switching means are cross- product frequencies and the inputs to said differential amplifier comprise complex cross-channels modulation data signals and data modulation from error voltage signal which are eliminated at the output of said differential amplifier. signal for controlling a phase locked loop of a QPSK receiver 5. A high speed multi-channel phase detector as set forth in claim 1 which further includes means for connecting each analog data input to only one phase channel.

6. A high speed multi-channel phase detector as set forth in claim 5 wherein the number of channels are greater than two channels and the output of said differential amplifier comprises the sum of the absolute values of all said analog data inputs.

7. A high speed multi-channel phase detector as set forth in claim 5 wherein the number of channels are greater than two channels and the output of said differential amplifier comprises the difference of the absolute values of all said analog data inputs.

* * * * *